US007610389B2

(12) United States Patent
Gbadegesin

(10) Patent No.: US 7,610,389 B2
(45) Date of Patent: *Oct. 27, 2009

(54) APPLICATION PROGRAMMING INTERFACE AND GENERALIZED NETWORK ADDRESS TRANSLATION FOR TRANSLATION OF TRANSPORT LAYER SESSIONS

(75) Inventor: Abolade Gbadegesin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 24 days.

This patent is subject to a terminal disclaimer.

(21) Appl. No.: 11/938,623

(22) Filed: Nov. 12, 2007

(65) Prior Publication Data

US 2008/0071915 A1    Mar. 20, 2008

Related U.S. Application Data

(63) Continuation of application No. 10/858,754, filed on Jun. 2, 2004, now Pat. No. 7,305,477, which is a continuation of application No. 09/519,287, filed on Mar. 6, 2000, now Pat. No. 6,779,035.

(51) Int. Cl.
*G06F 15/16* (2006.01)
(52) U.S. Cl. .................. 709/227; 709/228; 709/235; 709/245; 709/238; 719/328
(58) Field of Classification Search ............... None
See application file for complete search history.

(56) References Cited

U.S. PATENT DOCUMENTS

| | | | |
|---|---|---|---|
| 5,636,216 A | | 6/1997 | Fox et al. |
| 5,850,518 A | * | 12/1998 | Northrup ............ 709/203 |
| 6,006,258 A | * | 12/1999 | Kalajan ............ 709/219 |
| 6,058,431 A | * | 5/2000 | Srisuresh et al. ............ 709/245 |
| 6,075,938 A | * | 6/2000 | Bugnion et al. ............ 703/27 |
| 6,128,664 A | * | 10/2000 | Yanagidate et al. ............ 709/228 |
| 6,178,160 B1 | * | 1/2001 | Bolton et al. ............ 370/255 |
| 6,266,707 B1 | * | 7/2001 | Boden et al. ............ 709/245 |
| 6,327,242 B1 | * | 12/2001 | Amicangioli et al. ............ 370/216 |

(Continued)

OTHER PUBLICATIONS

Michael Borella, Gabriel Montenegro, "RSIP: Address Sharing With End—to—End Security" Publication Date: Mar. 20, 2000, http://www.usenix.org/publications/library/proceedings/ine2000/full_papers/borella/borella.pdf.

(Continued)

*Primary Examiner*—Syed A. Zia
(74) *Attorney, Agent, or Firm*—Wolf, Greenfield & Sacks, P.C.

(57) ABSTRACT

An application programming interface for translation of transport-layer sessions is presented. The system includes kernel-mode support for application-controlled network address translation and user-mode implementation of the redirect API routines. An application process may request that a network gateway modify the source and/or destination of a given network session in a manner transparent to the original source host and/or the replacement destination host. With the generalized NAT (gNAT) of the instant invention and its associated API, both the source and the destination addresses of message packets may be changed. The address changes are mapped in the gNAT, and may result in apparent sessions between different clients and servers. Depending on the protocol in use (e.g. TCP or UDP), the address translation may be made dynamically by the gNAT, under the command of the application, and take place at the kernel level.

21 Claims, 5 Drawing Sheets

U.S. PATENT DOCUMENTS

| | | | |
|---|---|---|---|
| 6,418,476 B1* | 7/2002 | Luciani | 709/238 |
| 6,457,061 B1* | 9/2002 | Bal et al. | 709/245 |
| 6,615,357 B1 | 9/2003 | Boden | |
| 6,717,949 B1 | 4/2004 | Boden | |
| 6,772,210 B1 | 8/2004 | Edholm | |
| 6,779,035 B1 | 8/2004 | Gbadegesin | |
| 6,886,103 B1 | 4/2005 | Brustoloni | |
| 2005/0091365 A1* | 4/2005 | Lowell et al. | 709/224 |

OTHER PUBLICATIONS

Ole J. Jacobsen, The Internet Protocol Journal, vol. 3 No. 4, Dec. 2000.

D. Chouinard, Socks V5 UDP and Multicast Extensions to Facilitate Multicast Firewall Traversal, Nov. 20, 1997, Retreived on May 23, 2007.

Abolade Gbadegesin, Windows NT, Network Address Translator, Network Address Translation Services natapi.doc, Version 0.1, Apr. 4, 2000.

P. Srisuresh, et al., IP Network Address Translator (NAT) Terminology and Considerations, Aug. 1999, Retrieved May 23, 2007.

Michael Borella, et al., Realm Specific IP: Protocol Specification, Aug. 1999, Retrieved May 23, 2007.

Jeffrey Lo, et al., Realm Specific IP: Framework, Aug. 1999, Retrieved May 23, 2007.

Ying-Da Lee, SOCKS: A protocol for TCP proxy across firewalls, Retrieved May 23, 2007.

M. Fisk, W. Feng , "Interactions of Realm Boundaries and End-to-End Network Applications" Publication Date: Aug. 1, 2000, http://www.osti.gov/energycitations/servlets/purl/768896-kqDJe2/webviewable/768896.PDF.

Mike Borella, "Protocol helps stretch IPv4 addresses" Publication Date: Jan. 17, 2000, http://www. networkworld.com/news/tech/0117tech.html.

Thomas J. Kostas, et al., "Real-Time Voice Over packet-Switched Networks", Publication Date: Jan. / Feb. 1998, http://ieeexplore.ieee.org/iel4/65/14452/00660003.pdf?tp=&isnumber=14452&arnumber=660003&punumber=65.

Lisa Phifer, "Realm-Specific IP for VPNs and Beyond", Publication Date: Jun. 23, 2000, http://www.isp-planet.com/ technology/rsip.html.

G. Montenegro, RSIP Support for End-to-end IPSEC, May 19, 1999, Retrieved on May 23, 2007.

Carolyn Duffy Marsan, The next best thing to IPv6, Sep. 21, 1999, Retrieved on May 23, 2007.

Dan Kegel, "comp.security.firewalls", NAT's and peer-to-peer networking, Jun. 15, 1998, Retrieved on May 23, 2007.

Christian Huitema, "RE: [midcom] London meeting time", http://www1.ietf.org/mail-archive/web/midcom/current/msg00600.html, Retrieved on May 23, 2007.

Abdallah Rayhan, "RE: [midcom] SIP MIDCOM flow . . . ", http://www1.ietf.org/mail-archive/web/midcom/current/msg00150.html, Retrieved on May 23, 2007.

Michael Borella, Realm Specific IP: Protocol Specification, Apr. 1999, Retrieved on May 23, 2007.

M. Chatel, "Classical versus Transparent IP Proxies" Network Working Group, Mar. 1999, [web page]. http://www.ietf.org/rfc/rfc1919.txt. [Accessed May 9, 2000].

"Nevod Adds Native Support for Multi-Player Games Including Diablo-Starcraft/Battle.net and Activision/Battlezone to its NAT1000 Internet Sharing Produxt Line," Nevod, Inc., Press Release, Dec. 14, 1998. http://www.nevod.com/products/nat1000__95.html.

F. Langa ed., "High-Speed Surfing," Windows Magazine, n 1002, Feb. 1, 1999.

F. Langa ed., "Easy, Low-Cost Web Access," Windows Magazine, n 1006A, Jun. 15, 1999.

"Ositis Software Announces the Launch of WinProxy 3.0, The Complete Internet Sharing Solution," Ositis Software, Press Release, Aug. 10, 1999.

"Windows 2000 Network Address Translator," Microsoft Corporation, Apr. 23, 1999.

"Windows NT Network Address Translator," Microsoft Corporation, Oct. 3, 1998.

K. Egevang, et al., "The IP Network Address Translator (NAT)," Network Working Group, May 1994. [web page], http://www.ietf.org/rfc/rfc1631.txt [Accessed Jan. 22, 2000].

H. Chawla, et al., Hydranet: network support for scaling of large-scale services, Computer Communications and Networks, 1998. Proceedings. 7th International Conference on Oct. 12-15, 1998 pp. 574-581.

* cited by examiner

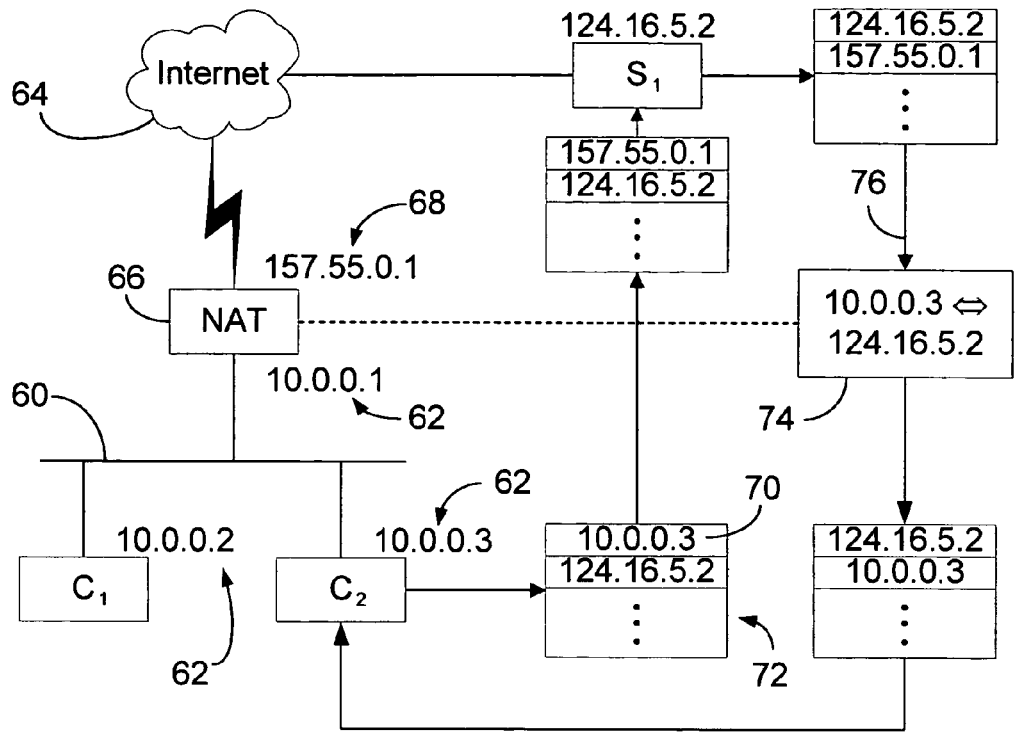
FIG. 2
(PRIOR ART)
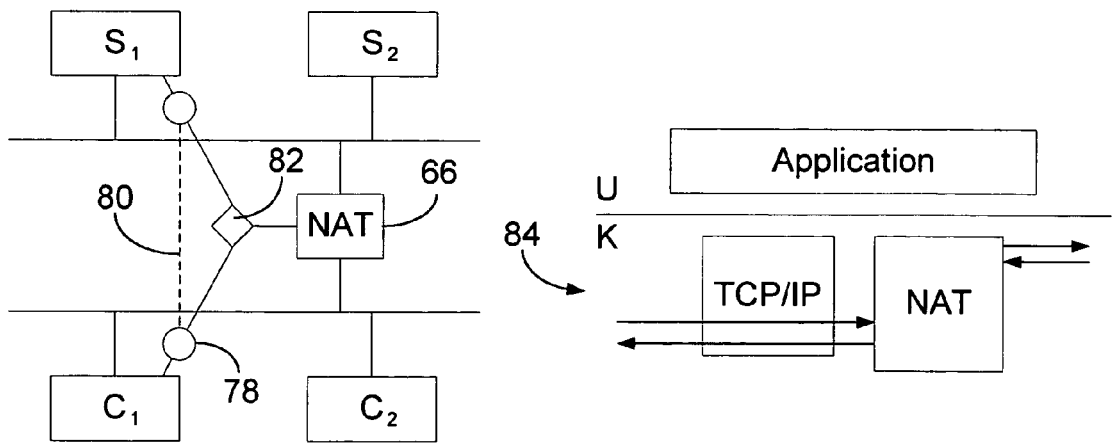
FIG. 3
(PRIOR ART)
FIG. 4
(PRIOR ART)

APPLICATION PROGRAMMING INTERFACE AND GENERALIZED NETWORK ADDRESS TRANSLATION FOR TRANSLATION OF TRANSPORT LAYER SESSIONS

CROSS-REFERENCE TO RELATED APPLICATIONS

This application is a continuation of U.S. patent application Ser. No. 10/858,754, filed Jun. 2, 2004, now U.S. Pat. No. 7,305,477 entitled "APPLICATION PROGRAMMING INTERFACE AND GENERALIZED NETWORK ADDRESS TRANSLATOR FOR TRANSLATION OF TRANSPORT-LAYER SESSIONS", which is a continuation of U.S. patent application Ser. No. 09/519,287, filed Mar. 6, 2000, entitled "APPLICATION PROGRAMMING INTERFACE AND GENERALIZED NETWORK ADDRESS TRANSLATOR FOR TRANSLATION OF TRANSPORT-LAYER SESSIONS", which issued as U.S. Pat. No. 6,779,035 on Aug. 17, 2004. The entireties of the aforementioned applications are incorporated herein by reference.

TECHNICAL FIELD

This invention relates generally to network address translation and, more particularly, relates to generalized network address translation under application program control.

BACKGROUND OF THE INVENTION

As the number of computers that needed or wanted to be connected to the Internet continued to grow, it soon became obvious that this number could not be accommodated by the number of available IP addresses, known as dotted-quads. In response to this address depletion problem, a method as illustrated in FIG. 2 was devised whereby a number of computers $C_1$, $C_2$ etc. could be located on a "private" network 60 and would use private IP addresses 62 to communicate with each other. These private IP addresses could be reused on other private networks since no one outside the private network could see these addresses. In order to allow the computers on the private network to communicate with other computers $S_1$, $S_2$, etc. on a public network, such as the Internet 64, the private network utilizes one machine 66 to provide the gateway for all of the computers on the private network to reach the public network. Through the use of the private addresses 62 on the private network 60 and the gateway computer 66, the address depletion problem is at least slowed.

This gateway computer 66 runs a program called a network address translator (NAT) that has both a private IP address 62 and a public IP address 68. As computers on the private network attempt to establish sessions with a server on a public network (or another private network), the NAT changes the source address 70 of the message packets 72 from the private address of the client computer to its public IP address. In this way, the private IP address is not communicated on the public network. The messages all appear to have come from the public IP address of the NAT machine. The NAT maintains a mapping 74 of the translation from the private to the public IP address so that when messages are received from the public network in response as illustrated by line 76, the NAT can forward them to the proper client machine. This operation of the NAT is completely transparent to the client computers on the private network, i.e. they each believe that they are communicating directly with the public servers.

FIG. 3 illustrates this redirect capability of the NAT machine. Specifically, a client machine $C_1$ attempts to establish a session 78 directly with public server $S_1$ as indicated by dashed line 80. However, when the message from $C_1$ is detected by the NAT 66, it dynamically redirects 82 the message to $S_1$ and changes the source address as described above. The client process does not know that the NAT has changed its messages' source address, and continues to believe that it is communicating directly with the public server. Messages from the server $S_1$ are dynamically redirected 82 to the client $C_1$ based on the mapping of the address translation. As may be seen from FIG. 4, this address translation takes place at a low level, e.g. at the kernel level 84 in a Window's architecture.

While the NAT has greatly alleviated the address depletion problem, especially for home and small business networks, its translation of source addresses is fixed within its programming. That is, the traditional NAT does not allow any application control of the address translations that it performs. Additionally, since the address translation is performed on the message packets at such a low level within the kernel 84, the NAT can add almost no value, other than providing the raw source address translation. The NAT cannot even provide any destination address translations. If added value is desired, such as centralized virus scanning, site blocking, white listing, etc., a proxy must be used instead.

Traditional proxies, as illustrated in FIG. 5, are application programs existing in the user mode 86 that serve as the interface between the private 60 and the public 64 network (see FIG. 6). Unlike NATs, the proxy 88 must be addressed directly by the client machines as seen in the destination address field 90 of message packet 92, and therefore requires that the client applications $C_1$, $C_2$, etc. be setup to operate with a proxy 88. Many applications cannot do this, or require specific configuration changes to allow the use of a proxy, and therefore a proxy configuration may not be appropriate for all applications. When a proxy application 98 is used, all communications are sent to the proxy in the user mode 86 (see FIG. 5) as illustrated by lines 94, 96. The proxy 98 then determines whether and to whom to forward the communication on the public network. If the proxy determines that the message may be passed to a server on the public network, the proxy establishes a second session 100, copies the data to the second session, changes the source and destination address, and sends out the message (see, also FIG. 7). In operational terms as illustrated in FIG. 7, a client process $C_1$ establishes a first session 94 with the proxy 88 requesting access to a public server $S_1$. If the proxy agrees, a second session 100 is established with the server $S_1$ on the public network 64. Since all messages must pass from the kernel-mode network transport, e.g. TCP/IP 102, to the user-mode proxy 98, be copied to a second session, transferred back down to the kernel-mode driver 102, and finally transmitted to the network for the network application's other session, a significant performance degradation occurs.

SUMMARY OF THE INVENTION

The instant invention overcomes these and other problems by providing an application programming interface for translation of transport-layer sessions. Specifically, the inventive concepts of the instant invention relate to a generalized network address translator (gNAT) and associated application programming interface (API) that allow both source and destination address translations to be made under application program control. This allows value to be added to the address translation. Additionally, it significantly increases the data flow speed over a traditional proxy since there is no longer a requirement that all information received at the kernel-mode be passed to the user-mode, copied to a second session, and passed back to the kernel-mode for transmission.

With the generalized NAT (gNAT) of the instant invention and its associated API, both the source and the destination addresses of message packets may be changed. The address changes are mapped in the gNAT, and may result in apparent sessions between different clients and servers. Depending on the protocol in use (e.g. TCP or UDP), the address translation may be made dynamically by the gNAT, under the command of the application, and take place at the kernel level. This significantly improves the data flow of the system by short-circuiting previously required data transfer between the kernel and user modes.

As discussed above, data transfer through a traditional proxy (a user-mode application) requires that the incoming messages from a client on a first session be transferred from the kernel-mode to the user-mode so that the proxy can deal with them. The proxy then would copy the message to a second session, and pass it back down to the kernel-mode for transmission to the server. Likewise, information from the server would arrive at the kernel level, be transmitted up to the user-mode for processing by the proxy, be copied to the other session, and be transmitted back down to the kernel-mode for transmission back to the client. Significant transmission delays were incurred as a result of all of these kernel-to-user-mode transitions.

The system of the instant invention eliminates, or at least greatly reduces, this overhead performance degradation while still adding value to the communication. Specifically, once the application, in this case a proxy, determines that a second session will be established (or a data session), it can command the generalized NAT through the API to perform an address translation at the transmission layer (kernel-mode), and therefore eliminate the transitions between kernel and user modes. The generalized NAT receives the incoming message from the client, confirms that it has a mapped translation, performs the address translation, and passes the message along to the server. Since this translation occurs at the kernel level, the data transfer performance is greatly improved.

Since the generalized NAT and associated API of the instant invention allows for destination address translation of a message packet, another advantage provided by the instant invention is server load balancing. This balancing is achieved by a server load control application that utilizes the gNAT through its associated API to command address translations away from heavily loaded servers to servers with more available capacity. Dynamic load balancing is also possible, dependent on the communication protocol used for the session. That is, a TCP session continues to address all message packets to a server once assigned thereto since the TCP protocol is connection oriented. UDP messages, on the other hand, may be dynamically redirected to an available server at the time of message delivery since UDP is message oriented.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is a network block diagram illustrating architectural and communicative aspects of a traditional network address translator;

FIG. 3 is an operational block diagram of a traditional network address translator;

FIG. 4 is an architectural diagram illustrating a traditional network address translator;

DETAILED DESCRIPTION OF THE INVENTION

Figure 1:
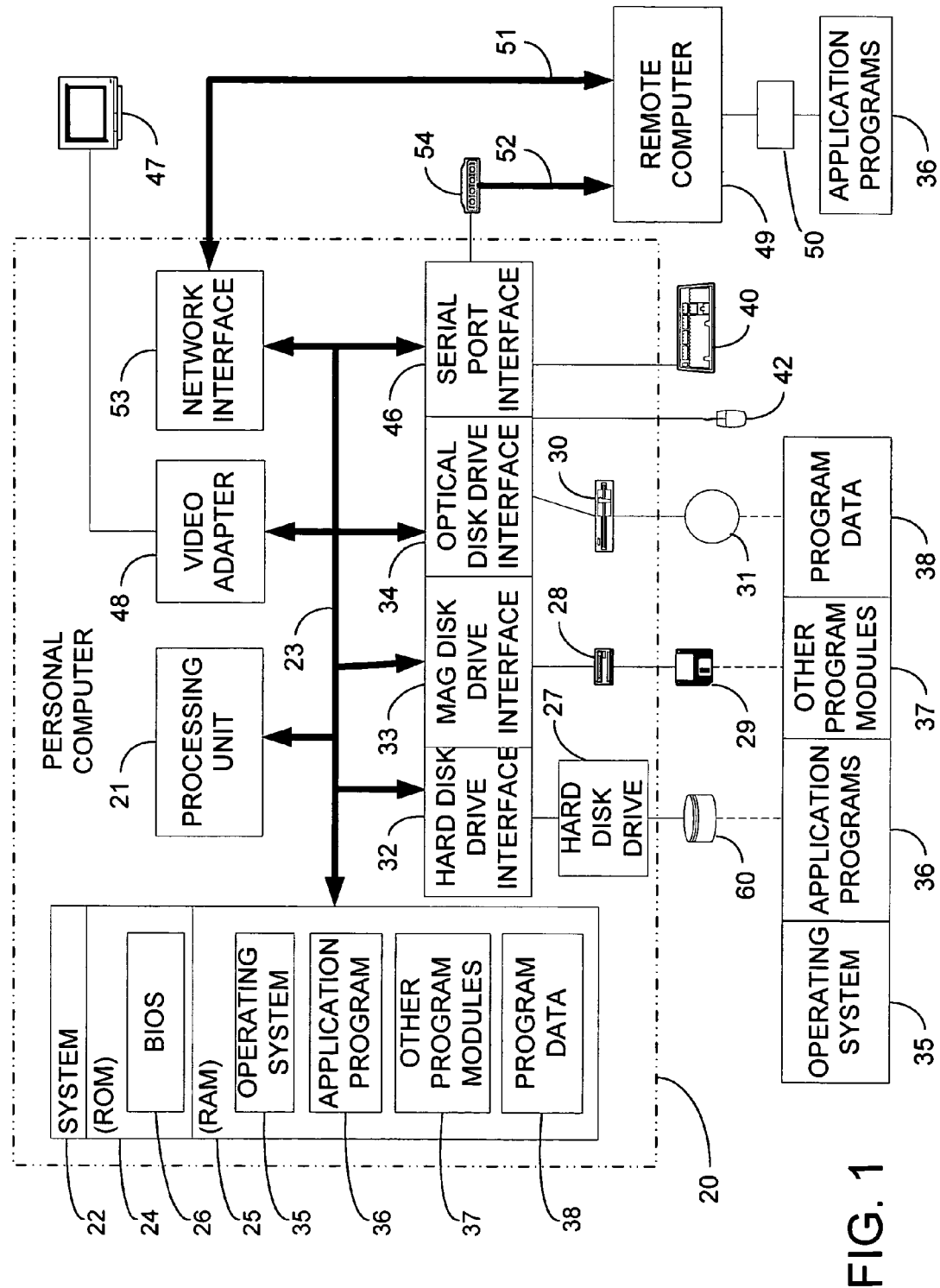
FIG. 1 is a block diagram generally illustrating an exemplary computer system on which the present invention resides.
Figure 6:
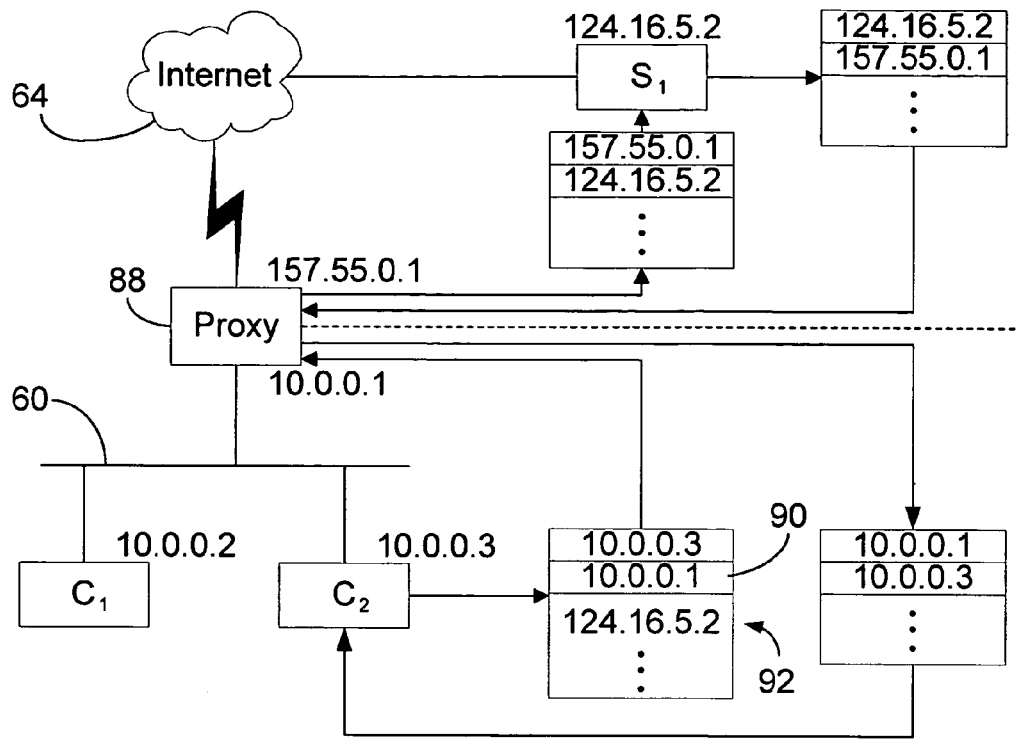
FIG. 6 is a network block diagram illustrating architectural and communicative aspects of a traditional proxy.
Figure 7:
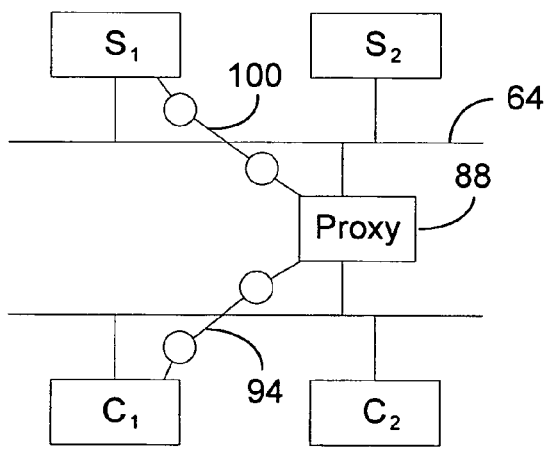
FIG. 7 is an operational block diagram of a traditional proxy.
Figure 5:
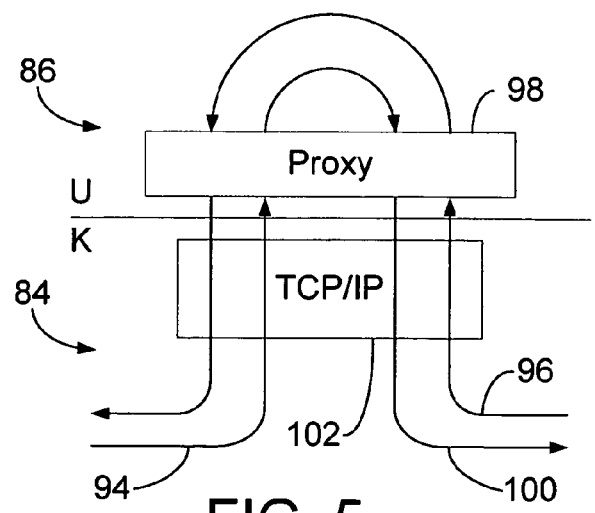
FIG. 5 is an architectural diagram illustrating a traditional proxy.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 8:
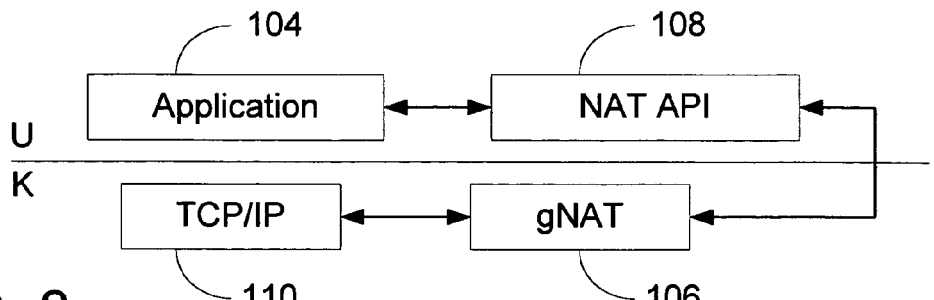
FIG. 8 is an architectural diagram illustrating the generalized network address translator and its associated application programming interface of the instant invention.

In accordance with the invention, generalized network address translation functionality is provided to application processes 104 by the architecture illustrated in FIG. 8. This functionality includes kernel-mode support for application-controlled network address translation through the generalized network address translator (gNAT) 106, and user-mode implementation of these redirect application programming interface (API) 108 routines. In this way, the system of the instant invention allows an application process 104 to request that a network gateway modify the source and/or destination address of a given network session in a manner transparent to the original source host and/or the replacement destination host. This ability made available by the instant invention allows true application-controlled arbitrary redirection on network sessions. While the application process 104 is illustrated in the user-mode, it should be recognized by those skilled in the art that the invention is not so limited to only user-mode applications. Indeed, a network application 104 using the services of the gNAT 106 may reside in kernel-mode. In such a situation, the API 108 would also exist in the kernel-mode, and such a situation is within the scope of the instant invention.

By generalizing the operation of network address translation and putting that operation under application 104 control, the system of the instant invention allows network applications 104 to achieve a number of benefits. For instance, server applications 104 can use the application programming interface 108 to make a group of servers appear to clients as a single server at a single IP address as will be described more fully below with reference to FIG. 11. This functionality may also be used to redirect sessions to support migration of services for enhanced availability. This functionality is unique to the system of the instant invention in that the application programming interface 108 allows server applications 104 to gain explicit control over the translation performed by the gNAT 106.

Further, as described above with reference to the traditional proxy, network applications that transfer information between separate network sessions typically suffer performance degradation. As discussed, this is because the network data must be received from the network for one of the network application's sessions, delivered to the user-mode network application by the kernel-mode network transport, read by the network application, written to the network application's other session, transferred to the kernel-mode driver, and transmitted to the network for the network application's other session. Instead of taking the above steps to copy data from one network session to another, the application programming interface 108 allows such network applications 104 to instruct the network gateway or generalized NAT (gNAT) 106 to translate one network session into another.

As may be seen from the architectural diagram of FIG. 8, the system of the instant invention comprises a kernel-mode translation module 106 that processes packets received from the network and modifies those packets in real-time, and a user-mode application programming module 108 that implements the interface invoked by network applications 104. The kernel-mode translation module 106 performs the functions of a generalized network address translator (gNAT). This module 106 is implemented in a preferred embodiment as a Windows 2000 driver that registers itself as a firewall driver with the Windows 2000 TCP/IP driver 110. Of course, one skilled in the art will readily appreciate that this module may also be adapted to operate in other operating systems without undue experimentation and without departing from the scope and spirit of the instant invention. Therefore, these alternate embodiments are hereby reserved. In its registration, the module 106 supplies an entry-point that is called by the TCP/IP driver 110 upon reception of every incoming packet and before transmission of every outgoing packet. This ensures that all packets will be observed by the kernel-mode translation module 106 before being sent, received, or forwarded.

Each application-requested translation is recorded by the kernel-mode translation module 106 as a redirect. Such a redirect consists of a description of the session to be translated, along with a description of the translation to be performed. For example, the description of the translation may state that when a session is detected with source address S and destination address D, translate it so that the source address becomes S' and the destination address becomes D'. When the module 106 detects any new network session, it determines whether there is a redirect that applies to the session. If the module 106 determines that there is a redirect for this session, the redirect is activated. The network session is automatically translated and a mapping is created to ensure that the same translation is done for all packets in the session. The normal processing is then continued on the session's translated packets, causing them to be delivered locally or forwarded depending on the new source and destination.

The user-mode application programming module 108 is also preferably implemented as a Windows 2000 library that is loaded by network applications 104. As with the above, the invention is not so limited to a particular operating system, but is applicable to any operating system which allows network communication. Therefore, the exemplary embodiments described herein are by way of illustration and not by way of limitation. A network application 104 calls the library 108 to initialize the kernel-mode translation module 106, and then creates one or more redirects for the network sessions to be translated.

In a preferred embodiment, the library 108 provides routines to perform at least the initializing and shutting down of the library. The initialization ensures that the kernel-mode translation module 106 is loaded and registered in preparation for translating network sessions. The shutting down of the library concludes the application's use of the kernel-mode translation module, which may be unloaded if it has no other clients. Further, the library 108 also includes routines for creating a redirect for a network session. This operation supplies information identifying a network session, along with information describing the translation to be done for the network session. A network session is identified by its protocol, its source IP address, its source port, its destination IP address, and its destination port. The protocol indicates the transport-layer protocol of the network session, which may be either TCP or UDP. The source IP address indicates the IP address of the network session's source host, and the source port indicates the port number of the network session's source host. The destination IP address indicates the IP address of the network session's destination host, and its destination port indicates the port number of the network session's destination host. The translation to be done for the network session may replace any of the last four parameters, however the transport-layer protocol cannot be changed. Finally, the library provided routines to cancel a redirect for a network session. This operation revokes a previous translation-request issued by the application 104.

Figure 9:
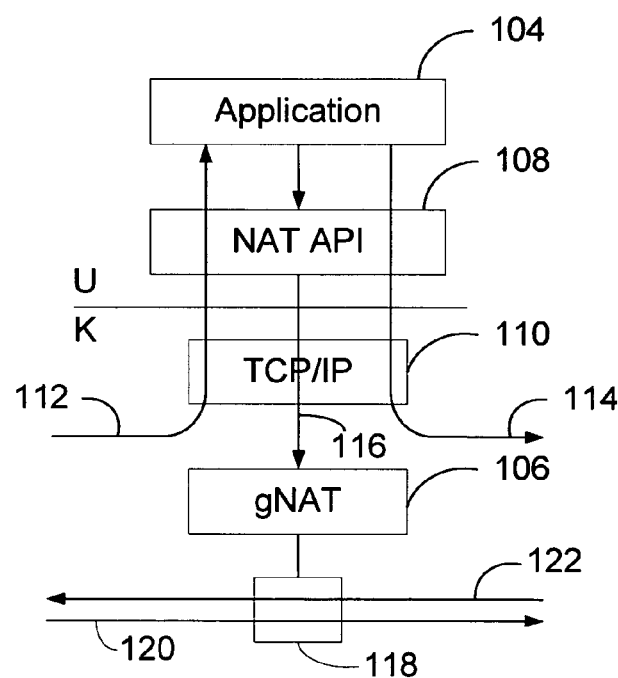
FIG. 9 is a functional architectural diagram of the instant invention.

The operation of translating network sessions at the transport-layer is illustrated in FIG. 9 to which specific reference is now made. Upon establishment of a network session by the receipt of network data on session line 112, the data is communicated to the network application 104. Upon processing by the network application 104, this initial data is copied to a second session 114, and transmitted to the network by the driver 110. This initial operation is much like a traditional proxy, except that the gNAT 106 may transparently redirect the data to the network application 104 if the client process is not aware of the network application. Unlike a traditional proxy, the network application 104 is now able to utilize the API 108 to command (illustrated by line 116) a dynamic redirect so that further data transitions from kernel-mode to user-mode are no longer required. This establishes a fast-path for proxy-like applications in which datagrams must be copied from one session to another. This fast-path transfer is ideal for data streaming applications, on-line gaming, multi-party conferencing, etc.

Once the network application 104 has determined that a dynamic redirect is appropriate and such has been commanded of the gNAT 106, it establishes a dynamic redirect mapping 118. All network data that is received from the network for the proper network application's session (as determined by the gNAT 106 in accordance with its commanded dynamic redirect 118) is automatically translated by the gNAT 106 so that its transport-layer address matches the network application's other session. This data is then transmitted to the network for the network application's other session. Graphically, this dynamic redirection at the transport layer is illustrated by line 120. As may be seen from line 120, the communication of the data to the network server no longer requires that the data go through two kernel-user mode translations, i.e. the trip to the application 104 is short circuited. Likewise, return data on line 122 may also be dynamically redirected to the client if so commanded by the network application 104. The approach allows such applications to achieve a considerable improvement in their performance.

This performance improvement becomes vividly apparent if the initial communication on line 112 opens an ftp control session carrying an ftp get file request. Under a traditional proxy scenario, the ftp data channel created to receive the file requested would first be passed from the kernel-mode to the user-mode to the proxy, and then would be passed back down to the kernel-mode to be forwarded to the client. As may well be imagined, this process incurs significant performance degradation, especially if the file is quite large. Under the system of the instant invention, however, the network application 104 may open a data session which does not require any transitions to the user-mode by commanding a dynamic redirection at the transport-layer. Now, as the data is received from the ftp server, the gNAT 106 performs the dynamic redirection in accordance with the application's command. The destination address of the data is simply translated and passed to the client as indicated by line 122. Significant performance improvement is achieved in this way.

The system of the instant invention also allows session payload editing. Certain applications include addressing information within the data streams of their sessions. For instance, many streaming applications use a control session to establish a secondary data session similar to that described above. This poses a problem for a traditional NAT in its primary application, i.e. transparent sharing of a single Internet connection among multiple machines. When running on clients that are sharing a connection, such applications would send private, unreachable addressing information to remote peers, and the latter would be unable to respond to the clients' requests. To solve this problem, the system of the instant invention supports an extensible means of modifying a session's application-layer data in flight, beyond the modifications made to the session's network-layer and transport-layer addressing information. Extensibility is achieved by allowing third-party drivers to inspect the application-layer data in each packet received for a session, and to edit the application data in each packet. These editors register themselves with the gNAT of the instant invention as handlers for a specific TCP/UDP port number, and are henceforth invoked for each message translated in matching sessions.

Figure 10:
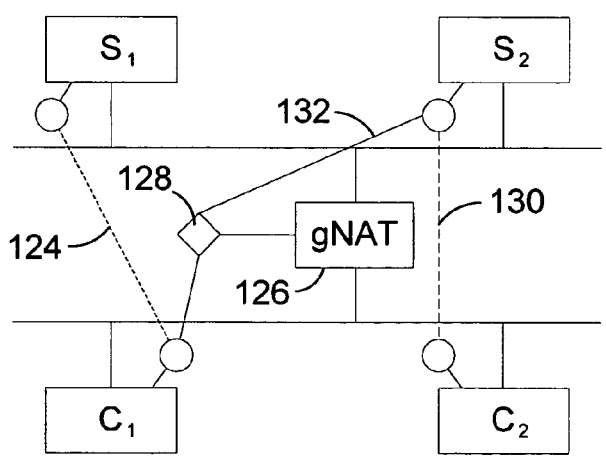
FIG. 10 is an operational block diagram illustrating an aspect of the instant invention.

In operational terms, the dynamic redirection made available by the system of the instant invention is illustrated in FIG. 10. A client $C_1$ may wish to establish a session with server $S_1$ by addressing messages thereto. This is the apparent session from the client $C_1$'s point of view, as illustrated by the dashed line 124. However, when the message from $C_1$ addressed to $S_1$ is detected by the gNAT machine 126, it checks to determine if a dynamic redirect exists for such a session. As illustrated in FIG. 10, a dynamic redirect 128 does exist. This dynamic redirect 128 may include a translation of both the source and destination addresses such that the messages are actually forwarded to server $S_2$ with an indication that the source was $C_2$. From the server $S_2$'s point of view, an apparent session 130 has been established between $S_2$ and $C_2$. The actual session 132 that has been established is between $C_1$ and $S_2$, although neither $C_1$ nor $S_2$ knows that this is the case. Each of the required translations is accomplished transparently.

Figure 11:
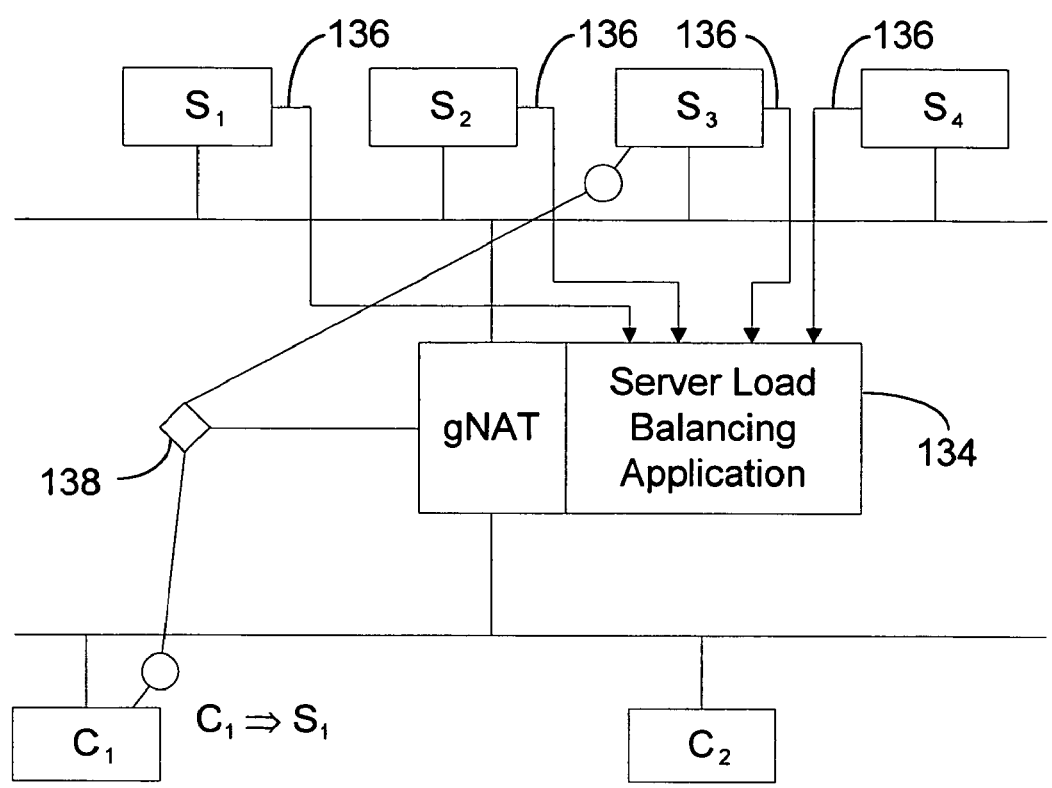
FIG. 11 is an operational block diagram illustrating server load balancing in accordance with the instant invention.

An application of this transparent redirection of destination addresses is illustrated in FIG. 11 in a multiple server environment. As introduced above, server load balancing may be achieved through the dynamic redirection of the destination addresses based on the protocol of the session, i.e. TCP or UDP. Obviously, since TCP sessions are connection based these sessions cannot be dynamically redirected to another server once established if that server becomes overloaded. However, since UDP messages are not connection based, each UDP message may be dynamically redirected upon receipt to an available (lightly loaded) server. The determination of the dynamic redirect to maintain load balancing of the various servers is made by a director or server load balancing application 134. Information 136 is actively collected from each of the servers, or is maintained internally to the application 134 based on prior redirections. This information on server loading is used to control the redirections to maintain balance of server loading. This redirection may be based on a number of factors and on different criteria. For example, the dynamic redirection may be based on the number of clients served by a server, the processing load being handled by the server regardless of the number of clients served thereby, the type of service required (FTP, HTTP, etc.), priority servicing based on membership, access control, etc.

By using the term balance it is not meant that perfect equality of processing capacity be maintained among all servers. Indeed, it may not be possible to achieve perfect equality, e.g. in a situation where there is one heavy user, and a two light users on a network with four or more servers. In this situation, at least one server will be basically unloaded, one will be heavily loaded, and one or two will be servicing the light users. However, even in this situation, if the dynamic redirection is operating to prevent all of the requests from going to one server, the system is performing server load balancing as used herein. In the illustration of FIG. 11, a client $C_1$ wishes to establish a session with server $S_1$. However, the server load balancing application 134 has determined that server $S_1$ is loaded, and that a dynamic redirect 138 to server $S_3$ should be established. The gateway machine 140 dynamically redirects the session transparently to server $S_3$ to maintain load balance.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A computer implemented system for application controlled network address translation comprising:
   at least one processor that executes the following computer executable components stored on at least one computer readable medium:
   a user-mode redirect application programming interface (API) employed by one or more applications to initialize a redirection of one or more network sessions; and
   a kernel-mode translation module that implements the redirection by translating a first network session into a second network session upon request from the one or more applications.

2. The system of claim 1, further comprising an entry point provided by the kernel-mode translation module, the entry point observes incoming and outgoing packets from a local network implementing the redirection.

3. The system of claim 1, the redirect comprises of identification of a session to be translated and description of translation to be performed by the kernel-mode translation module.

4. The system of claim 3, wherein the session to be translated is identified by describing protocol, source IP address, source port, destination IP address and destination port of the session.

5. The system of claim 4, wherein the protocol of the session is a transport-layer protocol that includes one of TCP (Transmission Control Protocol) or UDP (User Datagram Protocol).

6. The system of claim 1, further comprising a dynamic redirect mapping that ensures that all packets within the first session receive a similar translation.

7. The system of claim 6, wherein all data received for a proper application's session as determined by the kernel-mode translation module is automatically translated such that a transport-layer address of the data in the first session matches the second session.

8. The system of claim 1, wherein the user-mode API further comprises routines for canceling a previously requested network session redirect.

9. A method for implementing application controlled network address translation comprising:

employing a processor to execute computer readable instructions stored on a computer readable medium to perform the following acts:

receiving network data to be transmitted in a network session;

transmitting the network data to a network application;

determining if a dynamic redirect exists for the network data;

if the dynamic redirect exists then automatically translating the network data so that a transport-layer address of the network data from the network session matches a transport-layer address of a second session; and transmitting the translated data to the network in the second session.

10. The method of claim 9, further comprising dynamically redirecting incoming network data to a client machine under control of the network application, wherein the network application is associated with a user mode.

11. The method of claim 9, wherein creating a redirect for a network session comprises commanding the redirect by the network application and supplying information identifying the network session along with information describing the translation to be done for the network session at a kernel level.

12. The method of claim 11, wherein the network session is identified by a protocol, source IP address of the network session's source host, source port indicating a number of the network session's source host, destination IP address indicating an IP address of the network session's destination host and destination port indicating an IP address of the network sessions destination host.

13. The method of claim 12, wherein automatically translating the network session eliminates a transition between a user mode and a kernel mode.

14. The method of claim 9, wherein the determining if a dynamic redirect exists for the network data is performed by the network application, and the transmitting the translated data to the network in the second session is performed in a kernel mode by a generalized network address translator.

15. The method of claim 9, wherein the dynamic redirect causes the automatic translation of the network session to the second session in a kernel mode.

16. The method of claim 9, further comprising, inspecting data packets of the network session and modifying application-layer data of the data packets to prevent transmission of unreachable private addressing information to remote peers.

17. The method of claim 16, wherein the data packets are generated by a streaming application.

18. The method of claim 9, wherein the dynamic redirection balances load on a plurality of servers in a multi-server environment by dynamically redirecting one or more UDP messages to a lightly-loaded server from a heavily loaded server.

19. An apparatus for implementing application controlled network address translation comprising:

processor means for executing the following computer executable components stored on at least one computer readable medium:

means for receiving network data to be transmitted in a network session;

means for automatically translating the network data upon request by a network application so that a transport-layer address of the network data from the network session matches a transport-layer address of a second session; and means for transmitting the translated data to the network in the second session.

20. The apparatus of claim 19, wherein the means for automatically translating network data exists in a kernel mode that short-circuits a user mode to kernel mode transition.

21. The apparatus of claim 19, wherein the network application commands a redirect of the network data from the network session to the second session, for implementation with a generalized network address translator in a kernel mode.

* * * * *